United States Patent
Imura et al.

(10) Patent No.: US 7,079,582 B2
(45) Date of Patent: Jul. 18, 2006

(54) IMAGE CODING APPARATUS AND IMAGE CODING METHOD

(75) Inventors: Koji Imura, Machida (JP); Daiji Ido, Yokohama (JP); Akihiro Miyazaki, Sakai (JP); Koichi Hata, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 657 days.

(21) Appl. No.: 10/070,388

(22) PCT Filed: Jul. 3, 2001

(86) PCT No.: PCT/JP01/05739

§ 371 (c)(1),
(2), (4) Date: Mar. 6, 2002

(87) PCT Pub. No.: WO02/05566

PCT Pub. Date: Jan. 17, 2002

(65) Prior Publication Data

US 2002/0136307 A1  Sep. 26, 2002

(30) Foreign Application Priority Data

Jul. 7, 2000 (JP) .............................. 2000-207297

(51) Int. Cl.
*H04N 7/12* (2006.01)

(52) U.S. Cl. .............................................. 375/240.24

(58) Field of Classification Search ...............................
375/240.02–240.07, 240.12–240.16, 240.24;
348/390.1; H04N 7/12

See application file for complete search history.

(56) References Cited

U.S. PATENT DOCUMENTS

| 5,719,986 | A | * | 2/1998 | Kato et al. ............... 348/390.1 |
| 5,768,533 | A |   | 6/1998 | Ran |
| 6,091,774 | A | * | 7/2000 | Hyodo et al. .......... 375/240.03 |
| 6,151,360 | A | * | 11/2000 | Kato et al. ............. 375/240.03 |
| 6,339,617 | B1 | * | 1/2002 | Ueda ..................... 375/240.16 |
| 6,826,229 | B1 | * | 11/2004 | Kawashima et al. ... 375/240.03 |

FOREIGN PATENT DOCUMENTS

EP     0725545 A2    8/1996

(Continued)

OTHER PUBLICATIONS

J. Shin, et al.; "Content-Based Packet Video Forwarding Mechanism in Differentiated Service Networks," IEEE Packet Video Workshop PV2000, Cagliari, Italy, 'Online!May 1, 2000, XP002317790 Retrieved from the Internet: URL: http://www.gta.ufrj.br/diffserv/2000pv-diffvideo.pdf> 'retrieved on Feb. 14, 2005! pp. 1-10.

(Continued)

*Primary Examiner*—Richard Lee
(74) *Attorney, Agent, or Firm*—Stevens, Davis, Miller & Mosher, LLP

(57) ABSTRACT

In a bit counter 214, an amount of codes included in one transmission unit is counted; in a significance decision section 217, the amount of codes counted in the bit counter 214 is divided by the number of coded macroblocks included in the one transmission unit to calculate an average amount of codes per one coded macroblocks; and in a threshold comparing section 220, the significance of the pertinent transmission unit is decided by comparing the average amount of codes to the calculated threshold based on a frame rate and a bit rate.

6 Claims, 6 Drawing Sheets

FOREIGN PATENT DOCUMENTS

| | | |
|---|---|---|
| GB | 2316838 | 3/1998 |
| JP | 05316355 | 11/1993 |
| JP | 06022293 | 1/1994 |
| JP | 06038050 | 2/1994 |
| JP | 07014514 | 1/1995 |
| JP | 08140049 | 5/1996 |
| JP | 9214721 | 8/1997 |
| JP | 09214721 | 8/1997 |
| JP | 11331839 | 11/1999 |
| KR | 1998018895 | 6/1998 |

OTHER PUBLICATIONS

N. Cranley, et al.; "Quality of Service for Streamed Multimedia over the Internet," ISSC2000, Irish Signals and Systems Conference, Belfield, UCD, Dublin, Ireland, Online! Jun. 2000, XP002317791, Retrieved from the Internet: URL:http://www.eeng.dcu.ie/{cranleyn/Publications/issc2000.pdf> retrieved on Feb. 14, 2005! pp. 1-8.

C.-C. Liu, et al.; "Providing Unequal Reliability for Transmitting Layered Video Streams over Wireless Networks by Multi-ARQ Schemes," Image Processing, 1999, ICIP 99. Proceedings. 1999 International Conference on Kobe, Japan Oct. 24-28, 1999, Piscataway, NJ, USA, IEEE, US, vol. 3, Oct. 24, 1999, XP010368903, ISBN: 0-7803-5467-2, pp. 100-104.

\* cited by examiner

IMAGE CODING APPARATUS AND IMAGE CODING METHOD

TECHNICAL FIELD

The present invention relates to an image coding apparatus and image coding method preferably used for an image transmission apparatus to transmit a digital moving-picture signal to a radio communication terminal such as a cellular telephone.

BACKGROUND ART

Conventionally, there has been recommended by the International organization for Standardization/International Electrotechnical Commission (ISO/IEC), for example, ISO/IEC 14496-2(MPEG-4 Visual) as a technology which codes the moving-picture signals. The MPEG-4 Visual is a multimedia coding system and a technology which may code various kinds of video materials.

The image coding technology has been realized by three technologies, namely, "Motion compensation prediction coding system", "Discrete cosine transform", and, "Variable-length coding".

Hereinafter, these technologies will be described.

(1) Motion Compensation Prediction Coding System

First, the input image picture is compared with the previously encoded picture so as to predict the motion between those pictures, and an input image picture is predicted from the motion quantity and the previously encoded picture. Then, the difference (predicted error signal) between the predicted image and the input image picture is calculated, and the predicted error signal and the motion quantity which has been previously obtained is sent to the receiving side. Image information may be sent using a small amount of data through predicting the motion in the above-described manner. Here, Apart from this motion compensation prediction coding system, there is an intra coding system which does not code the difference between an input image picture and the previously encoded picture, but the image data themselves. The intra coding system has been often used when the arithmetic errors are initialized, or when degradation in the picture quality caused by transmission errors is recovered, and since the predicted errors are not used, the amount of generated codes is increased in this system.

(2) Discrete Cosine Transform (DCT)

The discrete cosine transform converts the above-described predicted error signal into the frequency domain. Image information may be transmitted by a further smaller amount of data through combination of the following feature and the variable-length coding system, as the feature of this system is that the power concentrates on a specific frequency domain (low frequency domain) when the predicted error signal is converted into the frequency domain.

(3) Variable-Length Coding System

The variable-length coding system is a system intended to reduce an average code length by expressing the events with high frequency of occurrence in terms of short code lengths, and of events with low frequency of occurrence in terms of long code lengths, making use of bias the events when there is bias in the frequency of occurrence with regard to data to be coded. Image information may be transmitted by a small amount of data, using the above-described system.

The above-described three element technologies are not applied to the whole image picture, but to each unit divided into coded blocks (macroblocks) of 16×16 pixels. Regarding to the above-described motion, switching between the motion compensation prediction coding system and the intra coding system is performed in macroblocks.

Recently, radio transmission technologies for moving-picture signals have been attracting much interest along with wide spread of radio communication terminals such as cellular telephones. Coding technologies with transmission error tolerance have been indispensable for radio transmission, as the radio transmission has a higher transmission-error rate compared with that of wire transmission.

Among technologies which control image degradation caused by transmission errors, there is a technology which is called a videopacket. The technology suggests transmission of coded data of a plurality of macroblocks as one transmission unit (video packet). The videopacket comprises of a video packet header information and coded data of an arbitrary number of macroblocks. The video packet header includes a position address (the address denotes at which position the pertinent macroblock is in the picture) of a first macroblock, and a parameter necessary for decoding.

As an example of the methods for forming the videopacket is the Japanese Patent Published Application No. Hei-7 (1995) -014514 in which the videopacket is formed when the amount of generated codes in macroblocks are accumulated and reaches a predetermined amount of codes. According to this method, in the video packet which has no motion in the picture such as backgrounds, there is a small amount of codes comprises many macroblocks, and in the video packet which has large motion in the picture, there is a large amount of codes comprises few macroblocks. Therefore, a degraded range may be minimized as parts with large motion comprise a smaller amount of macroblocks even when there are occurred errors in the video packet caused by transmission errors. That is, the deterioration is not noticeable as there is no motion, though the background parts include a lot of macroblocks. Bits may be efficiently assigned by applying the above method.

Generally, macroblocks with large amount of codes has large change in case of the motion compensation prediction coding system. That is, the macroblocks may be considered to represent parts with large motion. When there are generated transmission errors in the macroblocks, it is considered that effects on the image quality of regenerated images are large. That is, macroblocks with a large amount of generated codes is considered to have higher significance. On the other hand, degradation in the picture quality caused by transmission errors may be recovered, though there are a larger amount of generated codes because of no use of the prediction in the case of the intra coding. Then, this is also considered to have higher significance.

As another technology to improve the error tolerance, there is a technology (the Japanese Patent Published Application No. Hei-9 (1997) -214721) in which retransmission is performed according to the significance of images. In this technology, still images are converted into the frequency domain; variable-length coding of components with higher frequency than a predetermined frequency and that of components with lower one are independently performed, and two kinds of transmission frames are formed. Retransmission request is controlled only for the components with lower frequency rather than for the components with higher frequency when these frames are transmitted and transmission errors are found at the receiving side. Thereby, transmission efficiency may be improved, though there are acceptable degree of some degradations in the image quality.

However, there have been the following problems in the conventional image transmission systems.

Generally, when hierarchical coding is performed according to the frequency domain and the resolutions of images, overhead information is required by division of information and hence, a division loss caused by the requirement will be generated. That is, it is required to double the header information of each transmission unit when dividing into two, for instance, because the coded data are usually composed of header information and macroblock coded data at each transmission unit. This amount becomes an overhead.

Moreover, hardware for decoding processing of each hierarchy, or software resources for hierarchical coding is required, resulting in complex configuration of the apparatuses.

Recently, technologies for radio transmission of moving pictures have been studied, and a ratio of the above-described division loss has become so large, so that it may not be neglected, as the transmission rate of radio transmission paths is smaller than that of wire nets. Moreover, it is required for mobile terminals, which may receive moving pictures, to control the consumption low in order to make communication time longer as much as possible. However, the communication time of the terminals will be effected by the increase of hardware and software resources on account of hierarchical coding.

The object of the present invention is to provide an image coding apparatus and system in which hierarchical coding is not required; the significance of moving-picture coded data may be decided with an extremely simple configuration; and retransmission may be effectively controlled.

DISCLOSURE OF INVENTION

In order to realize the object, significance information is added to every transmission unit including a plurality of coded macroblocks, and the significance information is decided according to the amount of codes in the transmission unit in image transmission processing for retransmission control according to the significance of images.

BEST MODES FOR CARRYING OUT THE INVENTION

Hereinafter, referring to the attached drawings, the best modes for carrying out the invention will be described.

EMBODIMENT 1

Figure 1:
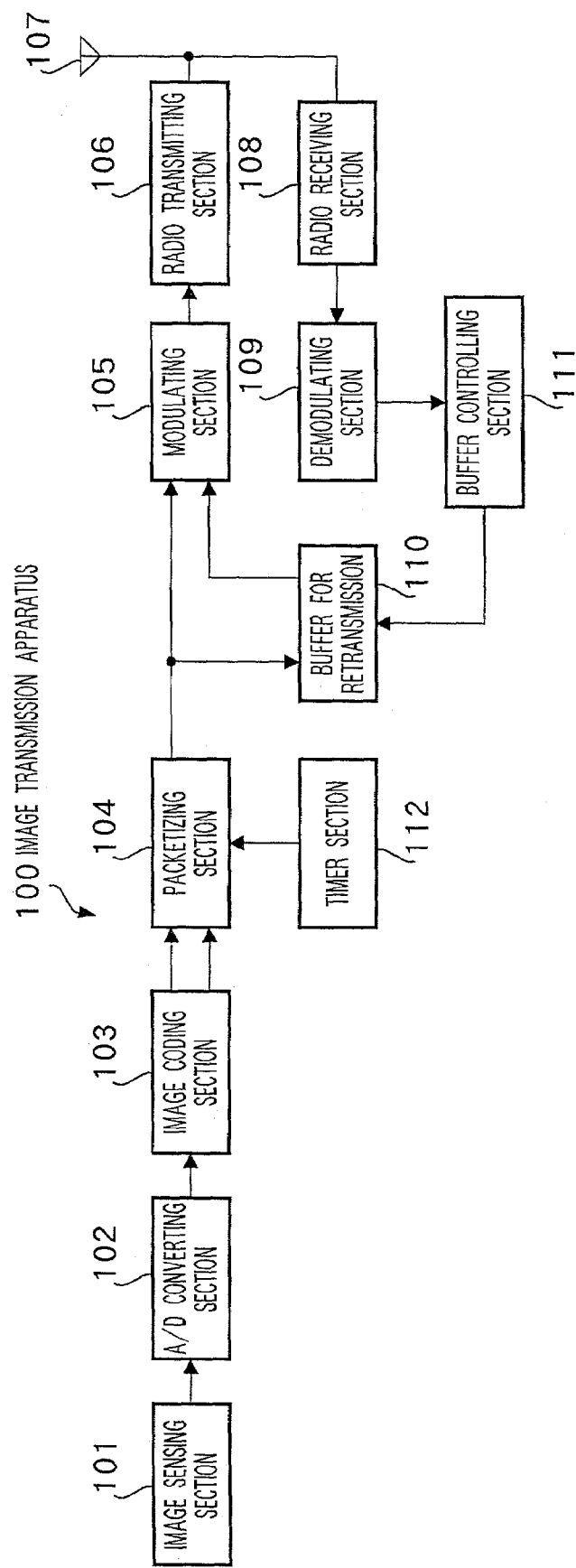
FIG. 1 is a block diagram showing a configuration of an image transmission apparatus according to embodiment 1 of the present invention.

FIG. 1 is a block diagram showing an image transmission apparatus according to embodiment 1 of the present invention.

In FIG. 1, an image transmission apparatus 100 according to the present embodiment which has an image sensor element such as a CCD (Charge Coupled Device) comprises: an image sensing section 101 which outputs analog image signal, an A/D (Analog/Digital) converting section 102 which outputs the image signals outputted from the image sensing section 101 after conversion into a digital signal, an image coding section 103 (image coding apparatus) wherein image coding processing is executed to the digital image signals converted in the A/D converting section 102, and outputs encoded macroblocks, a packetizing section 104 (significance-information adding means) which packetizes the macroblocks coded in the image coding section 103 every one transmission unit, a modulating section 105 digitally modulates transmission packets generated in the packetizing section 104, a radio transmitting section 106 performs predetermined radio transmission processing of the modulated signals outputted from the modulating section 105, an antenna 107 emits the modulated signals as well as catches the received modulated signals, a radio receiving section 108 receives the modulated signals caught by antenna 107, and outputs them after their conversion into signals which may be demodulated a demodulating section 109 demodulates the information received from the radio receiving section 108, a buffer 110 for retransmission accumulates transmission packets for retransmission, a buffer controlling section (control means) 111 controls the buffer 110 for retransmission to read out the transmission packets and a timer section 112 generates time by which time information is given to the macroblocks at generation of the transmission packets.

Figure 2:
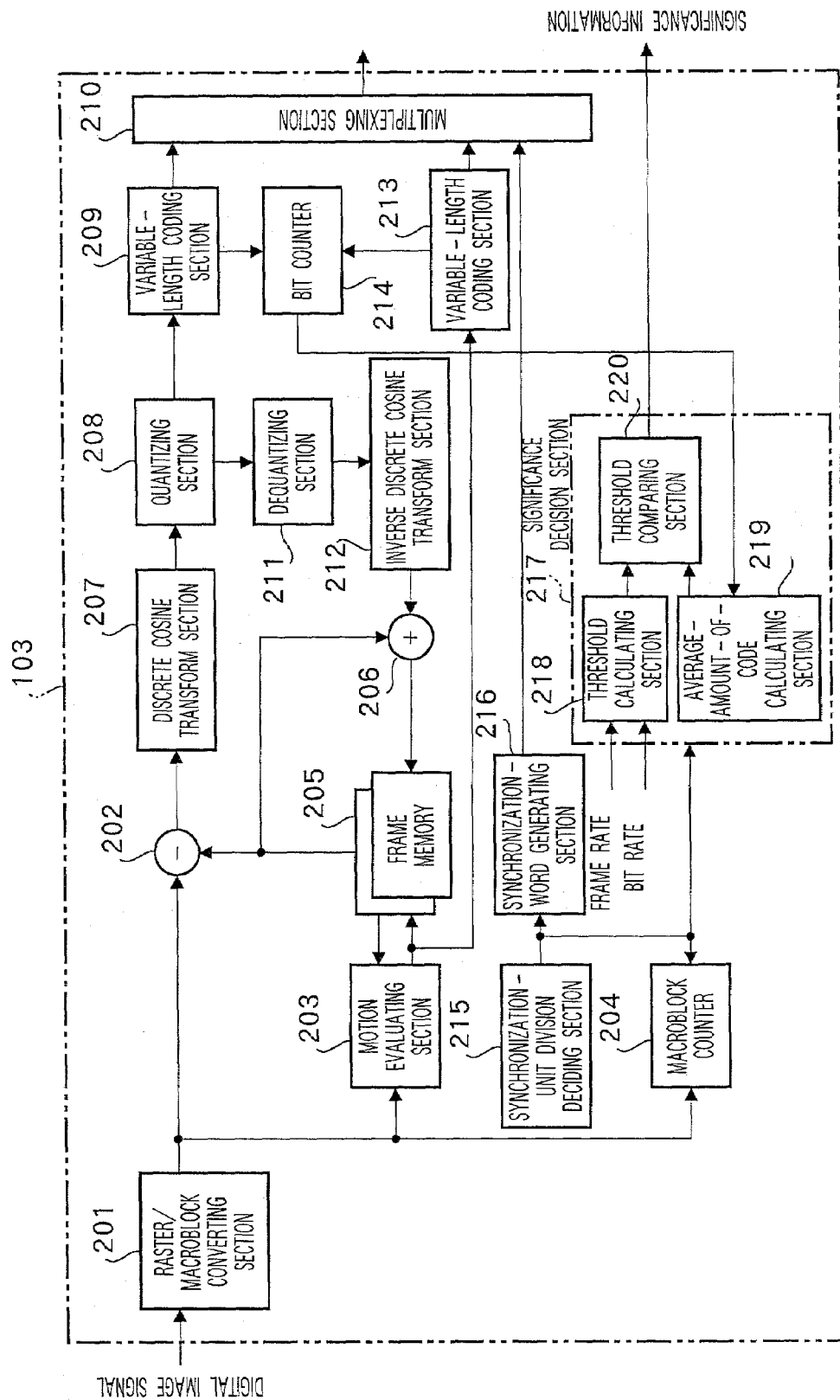
FIG. 2 is a block diagram showing a configuration of an image coding section of the image transmission apparatus according to embodiment 1 of the present invention.

FIG. 2 is a block diagram showing a detailed configuration of the image coding section 103.

In FIG. 2, the image coding section 103 comprises a raster/macroblock converting section 201, a difference calculator 202, a motion evaluating section 203, a macroblock counter 204, a frame memory 205 holds a coded regenerated-image of the previous picture, an adder 206, a discrete cosine transform section 207, a quantizing section 208, a variable-length coding section 209, a multiplexing section 210, a dequantizing section 211, an inverse discrete cosine transform section 212, a variable-length coding section 213, a bit counter 214, a synchronization-unit division deciding section 215, a synchronization-word generating section 216 and a significance decision section 217.

The raster/macroblock converting section 201 divides input digital image signals into coded macroblocks and inputs them to the difference calculator 202, motion evaluating section 203 and macroblock counter 204, respectively. The motion evaluating section 203 evaluates the motion quantity from the previous picture which has been read out from the frame memory 205 based on coded blocks (current pictures) from the raster/macroblock converting section 201. Then, the evaluated results are input as motion vectors to both, the frame memory 205 and variable-length coding section 213.

The variable-length coding section 213 performs variable-length coding process of the motion vectors inputted from the motion evaluating section 203, and inputs the results to both, the multiplexing section 210 and bit counter 214. A predicted image corrected by the motion vectors is read out from the frame memory 205, and inputted as predicted signals to the difference calculator 202 and to adder 206. The difference calculator 202 obtains the difference between the predicted image outputted from the frame memory 205 and the coded macroblocks which are under current processing, and the obtained difference value is inputted to the discrete cosine transform section 207 which in turn transforms the difference value received from the difference calculator 202 into a frequency domain in order to be inputted to quantizing section 208.

The quantizing section 208 quantizes the difference value from the discrete cosine transform section 207 based on a predetermined quantizing parameter, and inputs a quantized discrete cosine transform coefficient to both, variable-length coding section 209 and dequantizing section 211. The variable-length coding section 209 converts the discrete cosine transform coefficient outputted from the quantizing section 208 into variable-length codes to be inputted to the multiplexing section 210 and to the bit counter 214, respectively. The dequantizing section 211 dequantizes the discrete cosine transform coefficient which has been quantized in the quantizing section 208 for input to the inverse discrete cosine transform section 212. The inverse discrete cosine transform section 212 regenerates predicted error signals from the discrete cosine transform coefficient which has been dequantized for input to the adder 206. The adder 206 outputs the result of adding the predicted error signals outputted from the inverse discrete cosine transform section 212 and the predicted signals outputted from the frame memory 205. Regenerated images are reproduced by adding the predicted error signals and the predicted signals. The regenerated images are stored in the frame memory 205 as predicted images for coding the next picture.

The macroblock counter 204 counts coded macroblocks outputted from the raster/macroblock converting section 201, and inputs the counted value to both, the synchronization-unit division deciding section 215 and significance decision section 217. When the number of the coded macroblocks reaches a predetermined number, the synchronization-unit division deciding section 215 notifies the synchronization-word generating section 216 to output a synchronization word in order to delimit transmission units, and at the same time initializes the macro block counter 204. By receiving the notification to generate the synchronization word, the synchronization-word generating section 216 outputs the synchronization word from the synchronization-unit division deciding section 215. The synchronization word, the discrete cosine transform coefficient of which variable-length coding has been performed in the variable-length coding section 209, and the motion vector from the variable-length coding section 213 are all inputted to the multiplexing section 210 for multiplexing.

The bit counter 214 counts the number of bits of the motion vector and the discrete cosine transform coefficient of which variable-length coding has been performed and inputs the counted value to the significance decision section 217. The significance decision section 217 outputs significance information, only when it is decided that division of synchronous units should be performed in the synchronization-unit division deciding section 215.

The significance decision section 217 comprises a threshold calculating section 218, an average amount-of-code calculating section 219 and a threshold comparing section 220. The average amount-of-code calculating section 219 calculates an average amount of codes with regard to one coded macroblock by dividing the amount of codes which has been counted in the bit counter 214 included in one transmission unit by the number of coded macroblocks in one transmission unit, and inputs the result to the threshold comparing section 220.

The threshold calculating section 218 calculates a threshold for determining the significance of data of one transmission unit using frame rates and bit rates. In this case, the threshold T is obtained by the following expression $$T=(B/F)/N,$$

where it is assumed that F indicates frame rate, B bit rate, and N the number of coded macroblocks in the picture.

It may be considered that the threshold T is an average amount of codes per one coded macroblock.

The threshold comparing section 220 compares the average amount which has been calculated in the average amount-of-code calculating section 219 for codes of one transmission unit and the threshold value calculated in the threshold calculating section 218, and outputs significance information when the average amount of codes exceeds the threshold.

The image transmission apparatus 100 according to the present embodiment is configured as described above.

Then, an operational description of the image transmission apparatus 100 is given below.

In FIG. 1, image signals output from the image sensing section 101 are converted into digital image signals in the A/D converting section 102, and input to the image coding section 103. The digital image signals input to the image coding section 103 are coded with a predetermined coding algorithm, coded data, and the significance information on the coded data are input to the packetizing section 104. In the packetizing section 104, coded data, the significance information and the time information for the coded data are given, and transmission packets are generated, then generated transmission packets are inputted to the modulating section 105.

In the modulating section 105, carrier waves are modulated according to the input transmission packets to generate modulated signals, which are input to the radio transmitting section 106. In the radio transmitting section 106, the power of the input modulated signals is amplified to a predetermined level, and the modulated signals are emitted from the antenna 107.

Only the transmission packets with higher significance among the transmission packets generated in the packetizing section 104 are stored in the buffer 110 for retransmission. Here, modulated signals including a retransmission request are received in the radio receiving section 108 and input to the demodulating section 109 when there is the retransmission request from the receiving side based on erroneous transmission caused by errors generated during conveyance of transmission packets. Thereby, it is possible to recover degradation in the picture quality caused by the transmission errors. In the demodulating section 109, the retransmission request is demodulated from the input modulated signals, and input to the buffer controlling section 111. In order to retransmit specified transmission packets among the transmission packets held in buffer 110 for retransmission when the retransmission request is input, the pertinent transmission packets are read out from buffer 110, under the control of buffer controlling section 111, for retransmission and input to the modulating section 105. Thereby, the transmission packets to be retransmitted are outputted from the radio transmitting section 106, and emitted through the antenna 107.

Here, processing by which priority is given to transmission units after image coding will be described.

Digital images input to the raster/macroblock converting section 201 are divided, for example, into coded macroblocks of 16×16 pixel size. The divided coded-macroblocks are input to the motion evaluating section 203 in which motion quantity from the previous picture stored in the frame memory 205 is evaluated, and a motion vector is outputted. Variable-length coding process of the output motion vector is performed in the variable-length coding section 213 for input to the multiplexing section 210 and then to the bit counter 21.

Moreover, a predicted image corrected by the motion vector is outputted from the frame memory 205, the difference between predicted image and coded macroblocks which are under current processing is calculated in the difference calculator 202, and the resultant value is outputted. The difference value outputted from the difference calculator 202 is converted into the frequency domain in the discrete cosine transform section 207 and input to the quantizing section 208 for quantization. Then, they are further converted into variable-length codes in the variable-length coding section 209 after the quantization. Moreover, the quantized discrete cosine transform coefficient is input to the dequantizing section 211 and predicted error signals are regenerated in the inverse discrete cosine transform section 212 after the dequantization. The regenerated predicted-error signals and the predicted signals are added in the adder 206, then the regenerated image is regenerated. The reproduced regenerated-image is stored in the frame memory 205 as a predicted image in order to code the next picture.

On the other hand, the coded macroblocks outputted from the raster/macroblock converting section 201 are counted in the macroblock counter 204 and the counted value is inputted to the synchronization-unit division deciding section 215. When the counted value of the coded macroblocks reaches a predetermined value, a synchronization word is outputted from the synchronization-word generating section 216 based on notification from the synchronization-unit division deciding section 215 to the synchronization-word generating section 216. Moreover, the macro block counter 204 is initialized when the counted value of the coded macroblocks reaches a predetermined value.

When synchronous unit division is decided to be performed in the synchronization-unit division deciding section 215 and the decision is then inputted to the significance decision section 217, significance information is outputted from the significance decision section 217. In this case, an average amount of codes of coded blocks included in the transmission unit is calculated in the average amount-of-code calculating section 219 of the significance decision section 217 using the number of bits of the motion vector and the discrete cosine transform coefficient of which the variable-length coding has been performed and which have been counted in the bit counter 214. Next, the calculated average amount of codes is compared with a threshold calculated in the threshold calculating section 218 and significance information is outputted as information with higher significance when the amount exceeds the threshold.

Thus, according to the present embodiment, the amount of codes included in one transmission unit is counted in the bit counter 214, the amount of codes counted in the bit counter 214 is divided by the number of the coded macroblocks included in one transmission unit in the significance decision section 217, the average amount of codes per one coded macroblock is calculated, and the significance of the pertinent transmission unit is decided by comparing the average amount of codes outputted from the significance decision section 217 to the calculated threshold based on frame rates and bit rates in the threshold comparing section 220. That is, the significance of image data in the image coding processing may be decided by an extremely simple configuration.

Therefore, retransmission control may be efficiently performed, and image information with good quality may be provided even in the case of radio environments with higher generation frequency of the transmission errors. Thereby, excellent picture quality may be secured even when utilizing transmission paths with easily-caused transmission errors. For instance, distribution service of image information (for example, live distribution of video images).

EMBODIMENT 2

Then, an image transmission apparatus according to embodiment 2 of the present invention will be described.

Figure 3:
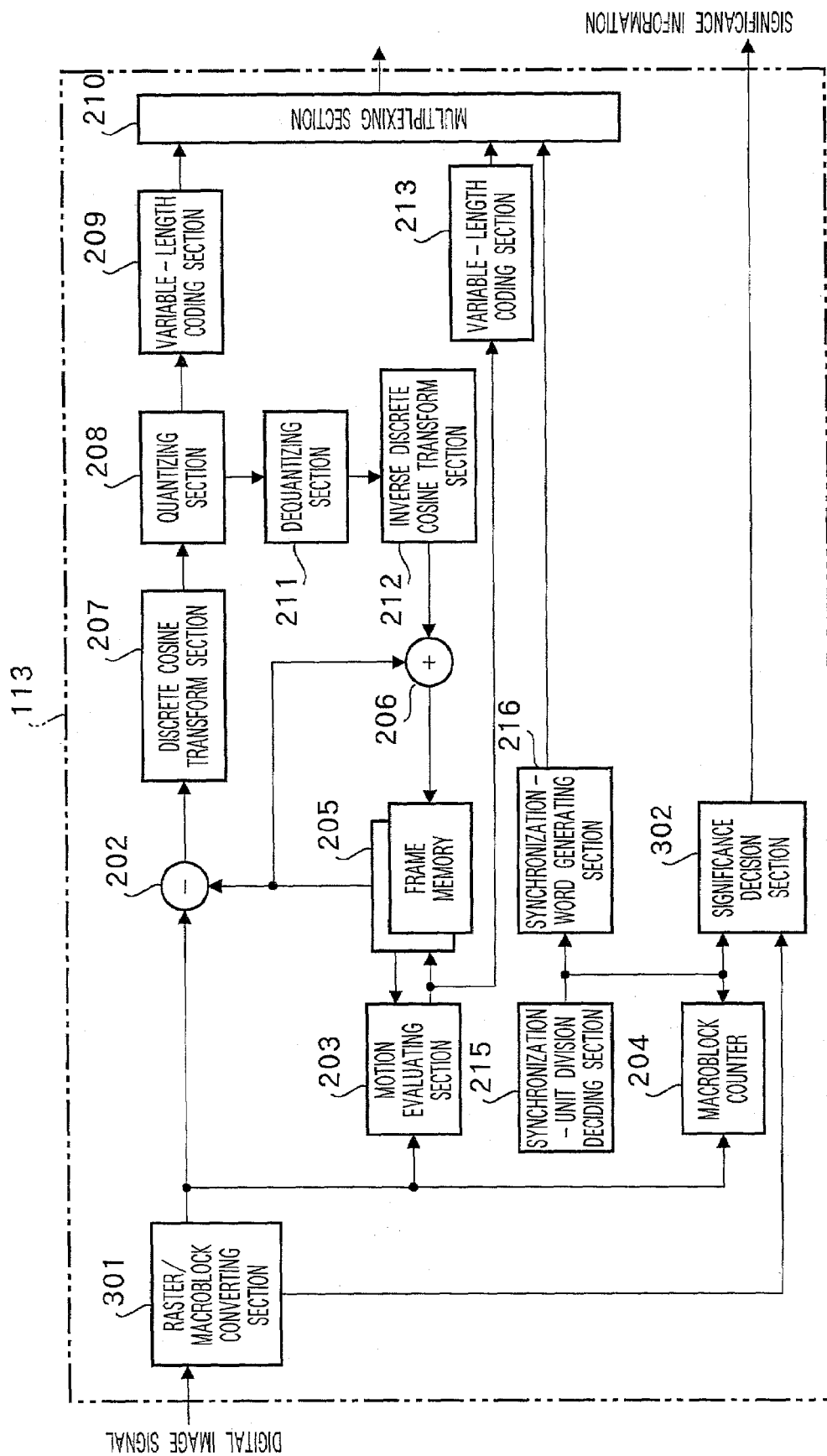
FIG. 3 is a block diagram showing a configuration of an image coding section of an image transmission apparatus according to embodiment 2 of the present invention.

FIG. 3 is a block diagram showing a configuration of an image coding section 113 of the image transmission apparatus according to the present embodiment. In FIG. 3, the sections having similar functions to those previously described in FIG. 2 are denoted in FIG. 3 by the same reference numbers as those in FIG. 2, and hence detailed description will be eliminated.

In FIG. 3, a raster/macroblock converting section 301 outputs the vertical synchronizing timing indicating the head of a picture while changing and outputting an input image signals to a coded macroblocks. A significance decision section 302 outputs significance information only when there is a notification from a synchronization-unit division deciding section 215. The significance decision section 302 decides that only a transmission unit at the head of the picture has higher significance, and outputs significance information according to the vertical synchronizing timing received from the raster/macroblock converting section 301.

Thus, according to the present embodiment, the significance of image data in image coding processing may be decided by an extremely simple configuration in a similar manner to that of the image transmission apparatus according to the embodiment 1, as the significance of transmission units is decided based on whether picture header information required for decoding of pictures is included. Thereby, retransmission control may be efficiently performed, and excellent picture quality may be secured even when utilizing transmission paths with easily-caused transmission errors. For instance distribution service of image information (for example, live distribution of video images).

EMBODIMENT 3

Next, an image transmission apparatus according to embodiment 3 of the present invention will be described.

Figure 4:
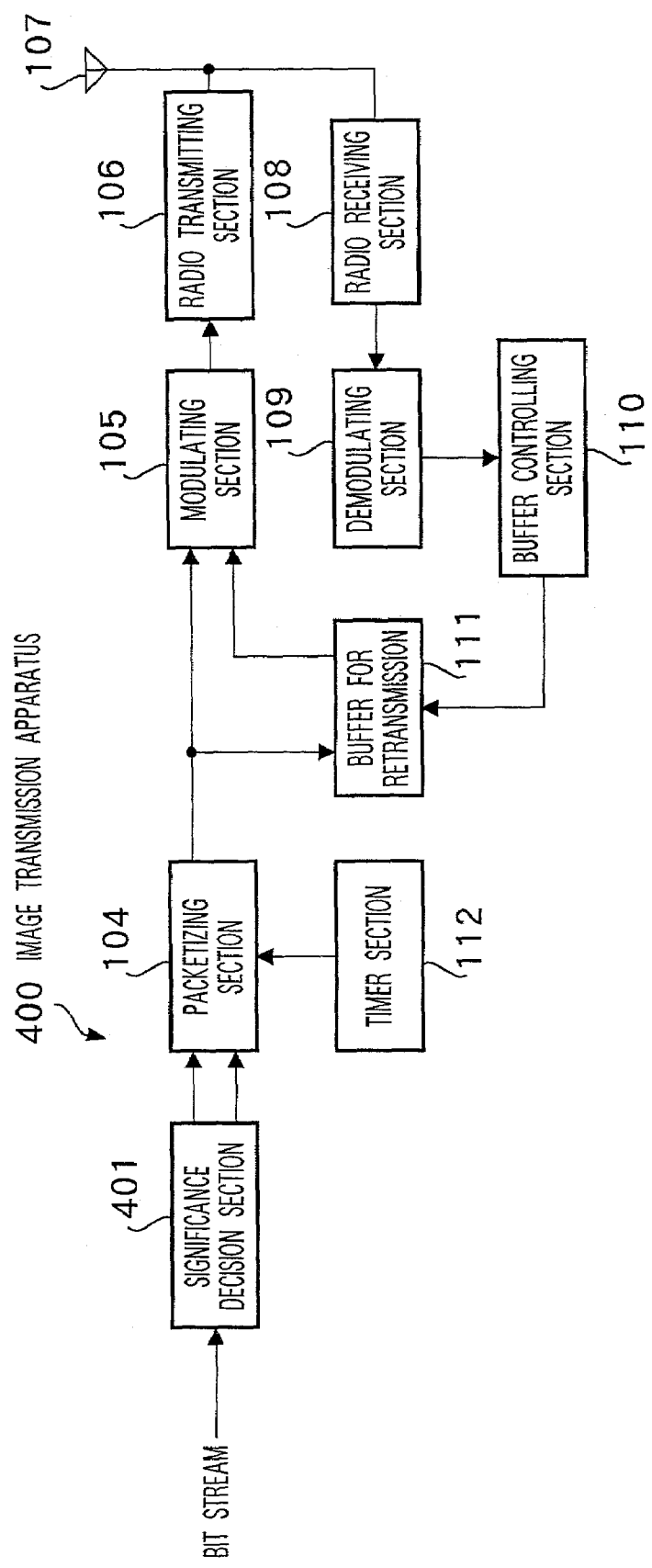
FIG. 4 is a block diagram showing a configuration of an image transmission apparatus according to embodiment 3 of the present invention.

FIG. 4 is a block diagram showing a configuration of an image transmission apparatus according to the present embodiment. Here, the sections having similar functions to those previously described in FIG. 1 are denoted in FIG. 4 by the same reference numbers as those in FIG. 1, and hence detailed description will be eliminated.

When a piece of image is coded, a bit sequence which is called a bitstream comprises a plurality of transmission units is obtained. A transmission unit at the head of the picture includes information required to decode the whole picture, and is called a picture header. When there are transmission errors occurred in the picture header, it becomes impossible to correctly decode transmission units after the second one included in the picture. The transmission unit with the picture header is very important. It is possible to decide the significance of the transmission unit with the picture header, using even the bitstream of which coding processing has been already completed.

Figure 5:
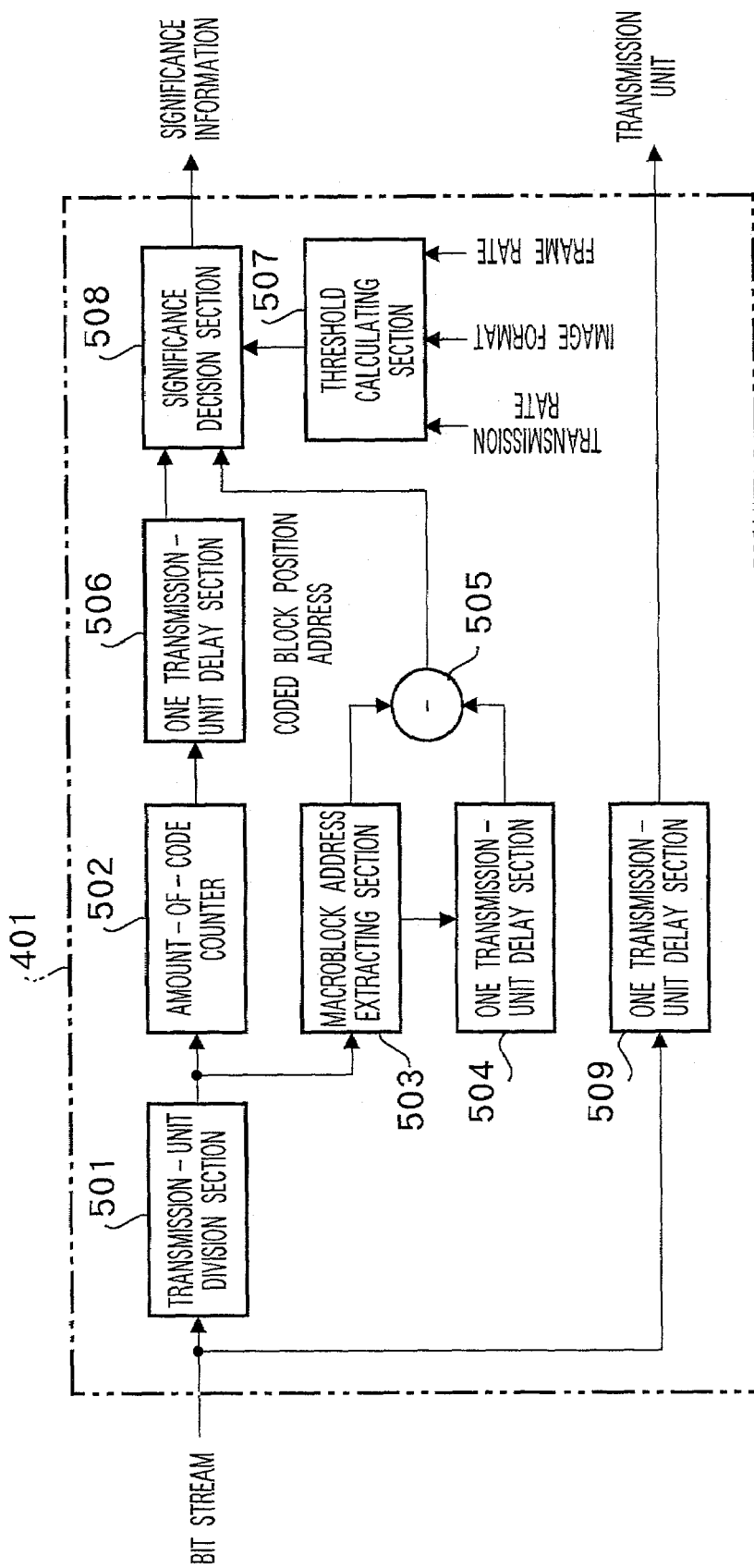
FIG. 5 is a block diagram showing a configuration of a significance decision section of the image transmission apparatus according to embodiment 3 of the present invention.

In FIG. 4, a significance decision section 401 decides the significance from the input bitstream after the completion of image coding. FIG. 5 is a block diagram showing a detailed configuration of the significance decision section 401. The significance decision section 401 comprises a transmission unit partitioning (see 3GPP TS standardization) section 501, an amount-of-code counter 502, a macroblock address extracting section 503, one-transmission-unit delay sections 504, 506 and 509, a difference calculator 505, a threshold calculating section 507 and a significance decision section 508 (though it has the same name as that of the significance decision section 401, it forms a part of the section 401).

Figure 6:
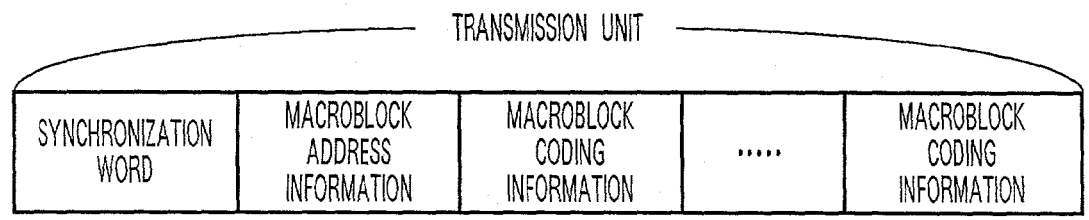
FIG. 6 is a view showing the configuration of a transmission unit.

The inputted bitstream is assumed to comprise a plurality of transmission units. Here, a synchronization word to acquire the head of each transmission unit is inserted in each transmission unit, as shown in FIG. 6.

In FIG. 5, the transmission unit partitioning section 501 searches for the synchronization word from the input bitstream, and divides the stream into the image transmission units. In this case, one transmission unit comprises codes from the current synchronization word to the code just before the next synchronization one. The divided transmission units are inputted to both, amount-of-code counter 502 and macroblock address extracting section 503. The amount-of-code counter 502 counts the number of bits constituting the input transmission unit and outputs the counted value. The macroblock address extracting section 503 reads out macroblock address information of the header information included in the head of the transmission unit and outputs the address information. The macro block address information is delayed by one transmission unit in the one-transmission-unit delay section 504 and the difference value is calculated by the difference calculator 505. This means that the difference of the macroblock address between the previous transmission unit and the current transmission one is calculated. Thereby, the number of coded blocks included in the previous transmission unit may be understood.

On the other hand, the number of bits in the transmission units which has been counted with the amount-of-code counter 502 is delayed by one transmission unit in the one-transmission-unit delay section 506. The threshold calculating section 507 calculates a threshold using the frame rate the bit rate and the image format information. In this case, the method for deciding the threshold is the same method as that in the embodiment 1 applied for the image transmission apparatus. Here, the method for deciding the threshold in the present invention is not limited to the above-described one, and it may be easily analogized that the present invention effectively act even with other decision methods.

The significance decision section 508 calculates the average amount of codes per coded macroblock included in the transmission unit using the number of bits and the number of coded macroblocks in the transmission unit, and then compares the average amount with a threshold calculated in the threshold calculating section 507. When the average amount of codes is larger than the threshold, significance information that has high significance is outputted.

Thus, according to the present embodiment, the significance of image data in image coding processing may be decided by an extremely simple configuration in a similar manner to that of the image transmission apparatus according to the embodiment 1 even for the bitstream of which the coding processing has been already completed , as the number of coded macroblocks included in the transmission unit and the amount of codes per transmission unit are counted. Thereby, retransmission control may be efficiently performed, and excellent picture quality may be secured even when utilizing transmission paths with easily-caused transmission errors. For instance distribution service of accumulated image data (for example, an image data base access).

EMBODIMENT 4

An image transmission apparatus according to embodiment 4 of the present invention will be described below.

The image transmission apparatus according to the present embodiment has the same configuration as that of embodiment 3 shown in FIG. 4 except the significance decision section. The significance decision section of the image transmission apparatus according to the present embodiment will be described, referring to FIG. 7.

Figure 7:
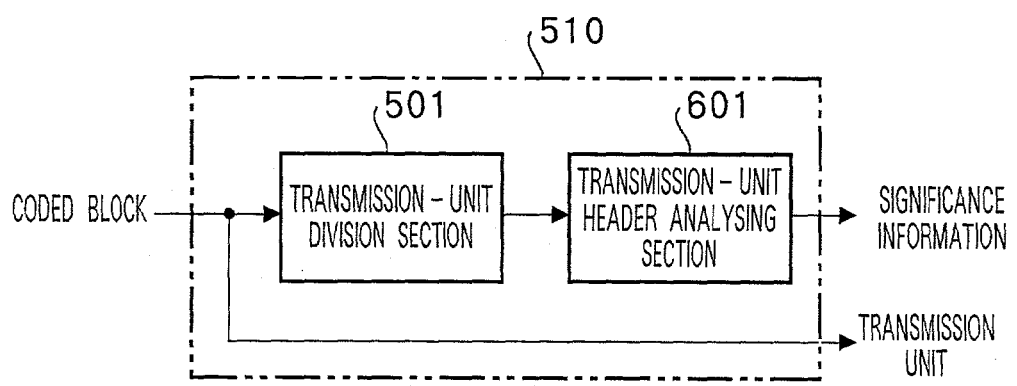
FIG. 7 is a block diagram showing a configuration of a significance decision section of an image transmission apparatus according to embodiment 4 of the present invention.

In FIG. 7, the significance decision section 510 is configured to comprise a transmission unit partitioning section 501 and a transmission unit header analyzing section 601. The transmission unit header analyzing section 601 analyzes a bit string in the head of transmission units divided in the transmission unit partitioning section 501. Though synchronization words exist in the head of each transmission unit, a synchronization word indicating the head of the picture uses different synchronization word from other synchronization words. Therefore, it is easily possible to decide by analysis of only the head of each transmission unit whether the synchronous unit is in the head of the picture. When the synchronization word indicating the head of the picture is detected, significance information which has high significance outputted.

Thus, according to the present embodiment, the significance of image data in image coding processing may be decided by an extremely simple configuration in a similar manner to that of the image transmission apparatus according to embodiment 1 even for the bit stream of which the coding processing has been already completed, as the bit string in the head of the transmission unit is analyzed. Thereby, retransmission control may be efficiently performed, and excellent picture quality may be secured even when utilizing transmission paths with easily-caused transmission errors. For instance distribution service of accumulated image data (for example, an image data base). Moreover, the present invention may be also realized by synthesizing circuits of special functions, or by software incorporated in microcomputers. When microcomputers are used, it is configured that the present invention is stored as programs in writable recording media such as ROM (Read Only Memory), and the stored programs are processed by the microcomputers. For, example, magnetic recording media, optical recording media, and magneto-optical media may be listed as the recording media, as well as semiconductor storage elements such as ROM.

Moreover, the present invention may be realized as an image coding apparatus by which only the image coding section has been treated as an independent apparatus and additionally, as a server which is provided by image transmission apparatus or image coding apparatus, for distribution of image information (image distribution server), as well as the image transmission apparatus. In addition, the invention may be applied for a communication terminal such as a base station apparatus and a mobile station apparatus in a digital radio communication system.

Furthermore, in embodiments 3 and 4 of the present invention, although the transmission is performed using given significance information which is decided from data after image coding, the above-described technologies may use a relay located between a transmission side and a terminal to switch from a transmission unit with no information on the significance to the one with the significance information (protocol conversion).

As described above, according to the present invention, retransmission control may be performed, and excellent picture quality may be secured even when utilizing transmission paths with transmission errors. For instance image data distribution service (for example, live distribution of video images), as the significance of image data may be decided in image coding processing with an extremely simple configuration.

The present description is based on the prior Japanese Patent Application No. 2000-207297, filed on Jul. 7, 2000. The entire contents are incorporated herein by reference.

INDUSTRIAL APPLICABILITY

The present invention is preferably used for an image transmission apparatus, more particularly, for an image transmission apparatus to transmit digital moving-picture signals to a radio communication terminal such as a cellular telephone.

The invention claimed is:

1. An image coding apparatus comprising:
   a coder that performs image coding processing for an image on a per macroblock basis;
   a macroblock counter that counts the number of macroblocks that are image coding processed in the coder for a transmission unit;
   a bit counter that, with respect to the transmission unit that is generated using a plurality of macroblocks coded in the coder, counts the amount of codes included in the transmission unit;
   a significance decider that determines an average amount of codes per macroblock in the transmission unit, from the counted number of macroblocks in the transmission unit and the counted amount of codes in the transmission unit, and determines an image decoding significance of the transmission unit, as it would be perceived at a destination of the transmission unit, according to the determined average amount of codes per macroblock; and
   a significance assigner that assigns significance information representing the determined image decoding significance to the transmission unit for inclusion therein, wherein:
   the significance decider comprises:
      an average code amount calculator that divides the counted amount of codes included in the transmission unit by the counted number of macroblocks in the transmission unit to determine the average amount of codes per macroblock in the transmission unit;
      a threshold calculator that calculates a threshold from a frame rate and a bit rate of the transmission unit; and
      a threshold comparator that outputs, when the determined average amount of codes per macroblock exceeds the calculated threshold, the significance information for use by the significance assigner and in determining whether to store the transmission unit for a prospective retransmission.

2. An image distribution server comprising the image coding apparatus of claim 1.

3. A base station apparatus comprising the image coding apparatus of claim 1.

4. An image coding method comprising:
   dividing a digital image into macroblocks and performing coding processing on a per macroblock basis;
   counting the number of macroblocks that are coding processed for a transmission unit;
   counting, with respect to the transmission unit that is generated using a plurality of the coded macroblocks, the amount of codes included in the transmission unit;
   determining an average amount of codes per coded macroblock in the transmission unit from the counted number of macroblocks in the transmission unit and the counted amount of codes in the transmission unit;
   determining an image decoding significance of the transmission unit, as it would be perceived at a destination of the transmission unit, according to the determined average amount of codes per coded macroblock; and
   assigning significance information representing the image decoding significance to the transmission unit for inclusion therein, wherein:
   the determination of the image decoding significance comprises:
      dividing the counted amount of codes included in the transmission unit by the counted number of macroblocks in the transmission unit to determine the average amount of codes per macroblock;
      calculating a threshold from a frame rate and a bit rate of the transmission unit; and
      outputting, when the determined average amount of codes per macroblock exceeds the calculated threshold, the significance information for use in assigning the information to the transmission unit and determining whether to store the transmission unit for a prospective retransmission.

5. A computer readable recording medium that stores an image coding program, said program comprising the operations of:
   dividing a digital image into macroblocks and performing coding processing for the image on a per macroblock basis;
   generating a transmission unit using a plurality of the coded macroblocks;
   counting the number of macroblocks in the transmission unit;
   counting the amount of codes included in the transmission unit;
   determining an average amount of codes per macroblock in the transmission unit from the counted number of macroblocks and the counted amount of codes in the transmission unit;
   determining an image decoding significance of the transmission unit, as it would be perceived at a destination of the transmission unit, according to the determined average amount of codes per macroblock; and
   assigning significance information representing the determined image decoding significance to the transmission unit for inclusion therein, wherein:
   the determination of the image decoding significance comprises:

dividing the counted amount of codes included in the transmission unit by the counted number of macroblocks in the transmission unit to determine the average amount of codes per macroblock;
calculating a threshold from a frame rate and a bit rate of the transmission unit; and
outputting, when the determined average amount of codes per macroblock exceeds the calculated threshold, the significance information for use in assigning the information to the transmission unit and determining whether to store the transmission unit for a prospective retransmission.

6. An image coding apparatus comprising the recording medium of claim 5.

* * * * *